United States Patent
Yokoi et al.

(10) Patent No.: US 11,524,896 B2
(45) Date of Patent: Dec. 13, 2022

(54) AQUEOUS HYDROGEN PEROXIDE PURIFICATION METHOD AND PURIFICATION SYSTEM

(71) Applicant: KURITA WATER INDUSTRIES LTD., Tokyo (JP)

(72) Inventors: Ikunori Yokoi, Tokyo (JP); Yoshiaki Ide, Tokyo (JP); Takaaki Chuuman, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 902 days.

(21) Appl. No.: 16/341,567

(22) PCT Filed: Sep. 19, 2017

(86) PCT No.: PCT/JP2017/033645
§ 371 (c)(1),
(2) Date: Apr. 12, 2019

(87) PCT Pub. No.: WO2018/074126
PCT Pub. Date: Apr. 26, 2018

(65) Prior Publication Data
US 2019/0263660 A1     Aug. 29, 2019

(30) Foreign Application Priority Data
Oct. 20, 2016   (JP) .............................. JP2016-206084

(51) Int. Cl.
*C08B 15/00*   (2006.01)
*B01J 39/05*   (2017.01)
(Continued)

(52) U.S. Cl.
CPC .............. *C01B 15/013* (2013.01); *B01J 39/05* (2017.01); *B01J 39/20* (2013.01); *B01J 41/05* (2017.01);
(Continued)

(58) Field of Classification Search
CPC ......... C01B 15/013; B01J 39/05; B01J 39/20; B01J 41/05; B01J 41/14; B01J 47/028; B01J 49/07
(Continued)

(56) References Cited

U.S. PATENT DOCUMENTS

| | | | |
|---|---|---|---|
| 6,896,867 B2* | 5/2005 | Tanaka ................ | C01B 15/0135 423/584 |
| 2002/0020671 A1* | 2/2002 | Tanaka ................ | C01B 15/0135 423/586 |
| 2010/0130626 A1* | 5/2010 | Fukui ....................... | C02F 1/42 521/29 |

FOREIGN PATENT DOCUMENTS

| | | | |
|---|---|---|---|
| JP | H11-139811 A | 5/1999 | |
| JP | H11-180704 A | 7/1999 | |

(Continued)

OTHER PUBLICATIONS

PCT/ISA/210, 220 & 237, "International Search Report for International Application No. PCT/JP2017/033645," dated Nov. 28, 2017.
(Continued)

*Primary Examiner* — Michael M. Bernshteyn
(74) *Attorney, Agent, or Firm* — Manabu Kanesaka

(57) ABSTRACT

A purification method for an aqueous hydrogen peroxide solution, includes passing the aqueous hydrogen peroxide solution through a first H-form strong cation exchange resin column 1, a salt-form strong anion exchange resin column 2 and a second H-form strong cation exchange resin column 3. An H-form strong cation exchange resin having crosslinking of 6% or less, an H-form strong cation exchange resin having crosslinking of 9% or more, or an H-form strong cation exchange resin produced by steps (a) and (b) is used as an H-form strong cation exchange resin packed in the second H-form strong cation exchange resin column 3: (a)
(Continued)

copolymerizing a monovinyl aromatic monomer with a crosslinkable aromatic monomer having a non-polymerizable impurity content of 3% by weight or less therein using a predetermined amount of a specified radical polymerization initiator at a predetermined polymerization temperature to obtain a crosslinked copolymer; and (b) sulfonating the crosslinked copolymer.

12 Claims, 2 Drawing Sheets

(51) Int. Cl.
*B01J 41/05* (2017.01)
*B01J 39/20* (2006.01)
*B01J 41/14* (2006.01)
*B01J 49/07* (2017.01)
*C01B 15/013* (2006.01)
*B01J 47/028* (2017.01)

(52) U.S. Cl.
CPC ............. *B01J 41/14* (2013.01); *B01J 47/028* (2013.01); *B01J 49/07* (2017.01)

(58) Field of Classification Search
USPC ........................................................ 423/584
See application file for complete search history.

(56) References Cited

FOREIGN PATENT DOCUMENTS

| JP | 2002-080207 | A |   | 3/2002 |
|----|-------------|---|---|--------|
| JP | 2012-188318 | A |   | 10/2012 |
| JP | 2012188318 | A | * | 10/2012 |
| JP | 2012188318 | A | * | 10/2012 |
| WO | 2008/129984 | A1 |   | 10/2008 |

OTHER PUBLICATIONS

Japanese Office Action of 2016-206084, dated Nov. 21, 2017.

* cited by examiner

AQUEOUS HYDROGEN PEROXIDE PURIFICATION METHOD AND PURIFICATION SYSTEM

TECHNICAL FIELD

The present invention relates to a purification method and a purification system for an aqueous hydrogen peroxide solution. The present invention particularly relates to a purification method and a purification system for stably purifying an aqueous hydrogen peroxide solution to high purity with an ion exchange resin having an excellent oxidation resistance and a low elution property.

BACKGROUND ART

An aqueous hydrogen peroxide solution is generally produced by the autoxidation of an anthracene derivative (anthraquinone autoxidation method) as follows:

2-Ethyl-anthrahydroquinone or 2-amyl-anthrahydroquinone is dissolved in a solvent and is allowed to mix with oxygen in the air to oxidize the anthrahydroquinone, thereby producing anthraquinone and hydrogen peroxide. The produced hydrogen peroxide is extracted with ion-exchanged water to separate the hydrogen peroxide from the anthraquinone. The resulting extract is distilled under reduced pressure to obtain an aqueous hydrogen peroxide solution having a concentration of 30 to 60% by weight. The anthraquinone as a by-product is converted back into the anthrahydroquinone by hydrogen reduction with a nickel or palladium catalyst, and reused.

The 30 to 60% by weight aqueous hydrogen peroxide solution obtained by distillation under reduced pressure is further purified depending on the desired quality grade. The purification method for an aqueous hydrogen peroxide solution proposed include a method for purifying an aqueous hydrogen peroxide solution by passing the aqueous hydrogen peroxide solution through an ion exchange resin column, a combination thereof with reverse osmosis (RO) membrane treatment, and the like (See, for example, Patent Literatures 1 and 2). Patent Literature 2 states that the aqueous hydrogen peroxide solution, after being subjected to RO membrane treatment may be treated, in the following order, with a cation exchange resin and an anion exchange resin, and further treated again with a cation exchange resin. Patent Literature 2 states that the degree of crosslinking of the cation exchange resin upstream of the anion exchange resin is usually in the range of 6 to 10 and preferably 7 to 9, and that the downstream cation exchange resin used is the same as the upstream cation exchange resin.

The impurity concentration required for the aqueous hydrogen peroxide solution to be obtained by purification varies depending on the intended use of the hydrogen peroxide aqueous solution. For example, in application as a cleaning fluid in a process of manufacturing electronic components, not only the processing performance of a purification system but also elution from members constituting the purification system need to be taken into consideration, since the metal concentration less than 10 ng/L are required.

In recent years, the concentrations of organic substances as impurities in a cleaning fluid used for cleaning in a process of manufacturing wafers and semiconductors is required to be further reduced.

The concentrations of organic substances in ultrapure water used for cleaning have been controlled at the total organic carbon (TOC) of 1 μg/L or less, whereas TOC in a 30 to 35% by weight aqueous hydrogen peroxide solution used in a cleaning fluid has been controlled at the order of mg/L which is 1000 times or more higher than that of ultrapure water. Therefore, TOC in the aqueous hydrogen peroxide solution has caused an increase in the TOC concentration in the cleaning fluid.

For example, in the case of an SC1 (Standard Clean 1) cleaning fluid, which is a mixture of aqueous ammonia, a 30 to 35% by weight aqueous hydrogen peroxide solution and ultrapure water, mainly used for removing fine particles, the 30 to 35% by weight aqueous hydrogen peroxide solution is diluted to only about ⅓ to 1/10 by volume by ultrapure water. Therefore, the TOC concentration in the SC1 cleaning fluid immediately before cleaning is determined by the amount of a carry-over of components other than ultrapure water in the cleaning fluid such as the aqueous hydrogen peroxide solution.

In the case of an SC2 (Standard Clean 2) cleaning fluid, which is a mixture of hydrochloric acid, a 30 to 35% by weight aqueous hydrogen peroxide solution and ultrapure water, mainly used for removing metals, the 30 to 35% by weight aqueous hydrogen peroxide solution is also diluted to only about ⅕ to 1/10 by volume by ultrapure water. Therefore, the TOC concentration in the SC2 cleaning fluid immediately before used for cleaning is also determined by the amount of a carry-over of components other than ultrapure water in the cleaning fluid such as the aqueous hydrogen peroxide solution.

CITATION LIST

Patent Literature

PTL1: JPH 11-139811 A
PTL2: JP 2012-188318 A

The recent processes of manufacturing advanced wafers or advanced semiconductors have presented a conspicuous problem of irregular decreases in yield due to organic substances in a cleaning fluid.

This problem has been caused by a variation between manufacturing lots in a TOC concentration in an aqueous hydrogen peroxide solution in the cleaning fluid even though the TOC concentration is not more than its controlled concentration. Such a variation has been attributed to the instability of the purification treatment of the aqueous hydrogen peroxide solution.

In the conventional methods, sufficient investigation has not been made on the oxidation resistance to hydrogen peroxide of the ion exchange resin, and there is a problem that the TOC concentration in the resulting purified aqueous hydrogen peroxide solution varies depending on the TOC eluted from the ion exchange resin due to oxidative degradation by hydrogen peroxide. Although this problem is reduced to a certain extent by the RO membrane treatment downstream of the ion exchange resin column, elution of the TOC itself from the ion exchange resin cannot be prevented and it cannot be described as a fundamental solution.

SUMMARY OF INVENTION

An object of the present invention is to provide a purification method and a purification system for stably purifying an aqueous hydrogen peroxide solution to high purity with an ion exchange resin having a superior oxidation resistance and a low elution property.

The present inventors have found that when purifying the high-pressure reverse osmosis membrane permeate water by sequentially passing it through a first H-form strong cation exchange resin column, a salt-form strong anion exchange resin column and a second H-form strong cation exchange resin column, a specified H-form strong cation exchange resin can be used at least in the second H-form strong cation exchange resin column to inhibit elution of TOC from the ion exchange resin and to thereby stably purify the aqueous hydrogen peroxide solution to high purity.

The present invention is summarized as follows:

[1] A purification method for an aqueous hydrogen peroxide solution, comprising sequentially contacting the aqueous hydrogen peroxide solution with a first H-form strong cation exchange resin, a salt-form strong anion exchange resin and a second H-form strong cation exchange resin, wherein the second H-form strong cation exchange resin is an H-form strong cation exchange resin having a degree of crosslinking of 6% or less, an H-form strong cation exchange resin having a degree of crosslinking of 9% or more, or an H-form strong cation exchange resin produced by the following steps (a) and (b):

(a) a step of copolymerizing a monovinyl aromatic monomer with a crosslinkable aromatic monomer having a non-polymerizable impurity content of 3% by weight or less therein using a radical polymerization initiator at a concentration of 0.05% by weight or more and 5% by weight or less relative to the total weight of the monomers at a polymerization temperature of 70° C. or more and 250° C. or less to obtain a crosslinked copolymer, wherein at least benzoyl peroxide and t-butyl peroxybenzoate are used as the radical polymerization initiator; and (b) a step of sulfonating the crosslinked copolymer.

[2] The purification method for an aqueous hydrogen peroxide solution according to [1], wherein the first H-form strong cation exchange resin is an H-form strong cation exchange resin having a degree of crosslinking of 9% or more, or an H-form strong cation exchange resin produced by the following steps (a) and (b):

(a) a step of copolymerizing a monovinyl aromatic monomer with a crosslinkable aromatic monomer having a non-polymerizable impurity content of 3% by weight or less therein using a radical polymerization initiator at a concentration of 0.05% by weight or more and 5% by weight or less relative to the total weight of the monomers at a polymerization temperature of 70° C. or more and 250° C. or less to obtain a crosslinked copolymer, wherein at least benzoyl peroxide and t-butyl peroxybenzoate are used as the radical polymerization initiator; and (b) a step of sulfonating the crosslinked copolymer.

[3] The purification method for an aqueous hydrogen peroxide solution according to [1] or [2], wherein the salt-form strong anion exchange resin is a salt-form strong anion exchange resin produced by the following steps (c), (d), (e), (f) and (g):

(c) a step of copolymerizing a monovinyl aromatic monomer with a crosslinkable aromatic monomer to obtain a crosslinked copolymer;

(d) a step of adjusting the polymerization temperature in the step (c) to 18° C. or more and 250° C. or less and setting a crosslinkable aromatic monomer content (purity) in the crosslinkable aromatic monomer at 57% by weight or more so that the content of an eluting compound represented by the chemical formula (I):

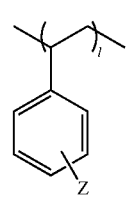

wherein Z represents a hydrogen atom or an alkyl group; and l represents a natural number;
is 400 µg or less relative to 1 g of the crosslinked copolymer of the monovinyl aromatic monomer and the crosslinkable aromatic monomer;

(e) a step of haloalkylating the crosslinked copolymer having the content of the eluting compound of 400 µg or less relative to 1 g of the crosslinked copolymer using a catalyst for Friedel-Crafts reaction in an amount of 0.001 to 0.7 parts by weight relative to 1 part by weight of the crosslinked copolymer;

(f) a step of washing the haloalkylated crosslinked copolymer with at least one solvent selected from the group consisting of benzene, toluene, xylene, acetone, diethyl ether, methylal, dichloromethane, chloroform, dichloroethane and trichloroethane to remove an eluting compound represented by the chemical formula (II);

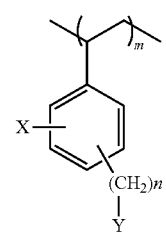

wherein X represents a hydrogen atom, a halogen atom or an alkyl group which may be substituted with a halogen atom; Y represents a halogen atom; and m and n each independently represent a natural number;
from the haloalkylated crosslinked polymer; and (g) a step of reacting an amine compound with the haloalkylated crosslinked polymer from which the eluting compound has been removed.

[4] The purification method for an aqueous hydrogen peroxide solution according to any one of [1] to [3], wherein at least one of the first H-form strong cation exchange resin, the salt-form strong anion exchange resin and the second H-form strong cation exchange resin is a gel-type resin.

[5] A purification system for an aqueous hydrogen peroxide solution, comprising a first H-form strong cation exchange resin column, a salt-form strong anion exchange resin column and a second H-form strong cation exchange resin column, and a means of sequentially passing the aqueous hydrogen peroxide solution through the first H-form strong cation exchange resin column, the salt-form strong anion exchange resin column and the second H-form strong cation exchange resin column, wherein an H-form strong cation exchange resin packed in the second H-form strong cation exchange resin column is an H-form strong cation exchange resin having a degree of crosslinking of 6% or less, an H-form strong cation exchange resin having a degree of crosslinking of 9% or more, or an H-form strong cation exchange resin produced by the following steps (a) and (b):

(a) a step of copolymerizing a monovinyl aromatic monomer with a crosslinkable aromatic monomer having a non-polymerizable impurity content of 3% by weight or less therein using a radical polymerization initiator at a concentration of 0.05% by weight or more and 5% by weight or less relative to the total weight of the monomers at a polymerization temperature of 70° C. or more and 250° C. or less to obtain a crosslinked copolymer, wherein at least benzoyl peroxide and t-butyl peroxybenzoate are used as the radical polymerization initiator; and (b) a step of sulfonating the crosslinked copolymer.

[6] The purification system for an aqueous hydrogen peroxide solution according to [5], wherein;

the H-form strong cation exchange resin packed in the first H-form strong cation exchange resin column is the H-form strong cation exchange resin having a degree of crosslinking of 9% or more, or the H-form strong cation exchange resin produced by the following steps (a) and (b):

(a) a step of copolymerizing a monovinyl aromatic monomer with a crosslinkable aromatic monomer having a non-polymerizable impurity content of 3% by weight or less therein using a radical polymerization initiator at a concentration of 0.05% by weight or more and 5% by weight or less relative to the total weight of the monomers at a polymerization temperature of 70° C. or more and 250° C. or less to obtain a crosslinked copolymer, wherein at least benzoyl peroxide and t-butyl peroxybenzoate are used as the radical polymerization initiator; and (b) a step of sulfonating the crosslinked copolymer.

The purification system for an aqueous hydrogen peroxide solution according to [5] or [6], wherein the salt-form strong anion exchange resin packed in the salt-form strong anion exchange resin column is a salt-form strong anion exchange resin produced by the following steps (c), (d), (e), (f) and (g):

(c) a step of copolymerizing a monovinyl aromatic monomer with a crosslinkable aromatic monomer to obtain a crosslinked copolymer;

(d) a step of adjusting the polymerization temperature in the step (c) to 18° C. or more and 250° C. or less and setting a crosslinkable aromatic monomer content (purity) in the crosslinkable aromatic monomer at 57% by weight or more so that the content of an eluting compound represented by the chemical formula (I):

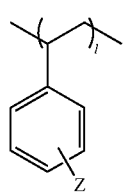

(I)

wherein Z represents a hydrogen atom or an alkyl group; and 1 represents a natural number;
is 400 μg or less relative to 1 g of the crosslinked copolymer of the monovinyl aromatic monomer and the crosslinkable aromatic monomer;

(e) a step of haloalkylating the crosslinked copolymer having the content of the eluting compound of 400 μg or less relative to 1 g of the crosslinked copolymer using a catalyst for Friedel-Crafts reaction in an amount of 0.001 to 0.7 parts by weight relative to 1 part by weight of the crosslinked copolymer;

(f) a step of washing the haloalkylated crosslinked copolymer with at least one solvent selected from the group consisting of benzene, toluene, xylene, acetone, diethyl ether, methylal, dichloromethane, chloroform, dichloroethane and trichloroethane to remove an eluting compound represented by the chemical formula (II):

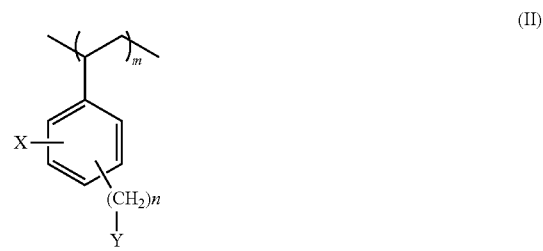

(II)

wherein X represents a hydrogen atom, a halogen atom or an alkyl group which may be substituted with a halogen atom; Y represents a halogen atom; and m and n each independently represent a natural number;
from the haloalkylated crosslinked polymer; and (g) a step of reacting an amine compound with the haloalkylated crosslinked polymer from which the eluting compound has been removed.

The purification system for an aqueous hydrogen peroxide solution according to any one of [5] to [7], wherein at least one of the H-form strong cation exchange resin packed in the first H-form strong cation exchange resin column, the salt-form strong anion exchange resin packed in the salt-form strong anion exchange resin and the H-form strong cation exchange resin packed in the second H-form strong cation exchange resin is a gel-type resin.

Advantageous Effects of Invention

According to the present invention, elution of TOC from ion exchange resins used for purification treatment can be inhibited to produce a high-purity aqueous hydrogen peroxide solution, strict in requirements for not only metals but also TOC therein, stably and reliably with no variation between lots.

DESCRIPTION OF EMBODIMENTS

Hereinafter, a purification method and a purification system for an aqueous hydrogen peroxide solution of the present invention will be described in detail with reference to the drawings. It should be understood that the following description is only illustrative of embodiments of the present invention which is not limited thereto, without departing from the scope of the invention.

Figure 1:
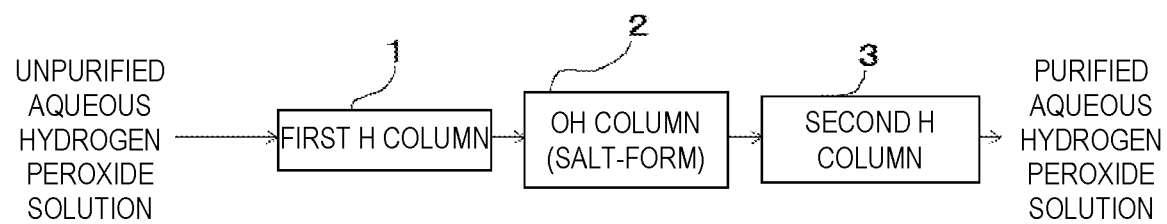
FIG. 1 is a systematic diagram showing an example of an embodiment of a purification system for an aqueous hydrogen peroxide solution of the present invention.
Figure 2:
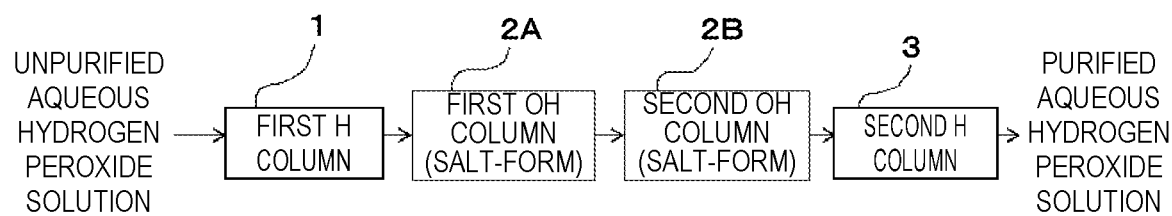
FIG. 2 is a systematic diagram showing another example of an embodiment of a purification system for an aqueous hydrogen peroxide solution of the present invention.

FIG. 1 and FIG. 2 are systematic diagrams showing examples of an embodiment of a purification system for an aqueous hydrogen peroxide solution of the present invention.

The purification system for an aqueous hydrogen peroxide solution shown in FIG. 1 is used for passing an unpurified aqueous hydrogen peroxide solution, in the following order, through a first H-form strong cation exchange resin column (hereinafter sometimes referred to as "first H column") 1, a salt-form strong anion exchange resin column (hereinafter sometimes referred to as "OH column") 2 and a second H-form strong cation exchange resin column (hereinafter sometimes referred to as "second H column") 3 to obtain a purified aqueous hydrogen peroxide solution.

The purification system for an aqueous hydrogen peroxide solution shown in FIG. 2 has such a configuration that two columns, i.e., a first salt-form strong anion exchange resin column (hereinafter sometimes referred to as "first OH column") 2A and a second salt-form strong anion exchange resin column (hereinafter sometimes referred to as "second OH column") 2B, which correspond to the salt-form strong anion exchange resin column in the purification system shown in FIG. 1, are arranged in series.

The number of each type of ion exchange resin column described above is not limited to one, but may be two or more.

The purification system of the present invention may be any purification system in which an aqueous hydrogen peroxide solution is contacted in the following order with the first H-form strong cation exchange resin, the salt-form strong anion exchange resin and the second H-form strong cation exchange resin. Each ion exchange resin may be packed in, but not limited to, a different column from each other, or two or more ion exchange resins may be laminated in the same column with a water-permeable partition plate(s) sandwiched therebetween.

The purification system of the prevent invention is a purification system for purifying an aqueous hydrogen peroxide solution by sequentially passing the first H column 1, the OH column 2 (or the first OH column 2A and the second OH column 2B) and the second H column 3, characterized by using, as the second H-form strong cation exchange resin packed in the second H column 3, an H-form strong cation exchange resin having a degree of crosslinking of 6% or less (hereinafter sometimes referred to as "low crosslinked resin"), a highly crosslinked resin having a degree of crosslinking of 9% or more (hereinafter sometimes referred to as "highly crosslinked resin"), or an H-form strong cation exchange resin produced by the following steps (a) and (b) (hereinafter sometimes referred to as "(a)-(b) resin"). The purification system of the prevent invention is preferably a purification system using, as the first H-form strong cation exchange resin packed in the first H column, an highly crosslinked resin having a degree of crosslinking of 9% or more or an (a)-(b) resin; and to use, as the salt-form strong anion exchange resin packed in the OH column 2 (the first OH column 2A and/or the second OH column 2B), a salt-form strong anion exchange resin produced by the following steps (c), (d), (e), (f) and (g) (hereinafter sometimes referred to as "(c)-(g) resin").

(a) a step of copolymerizing a monovinyl aromatic monomer with a crosslinkable aromatic monomer having a non-polymerizable impurity content of 3% by weight or less therein using a radical polymerization initiator at a concentration of 0.05% by weight or more and 5% by weight or less relative to the total weight of the monomers at a polymerization temperature of 70° C. or more and 250° C. or less to obtain a crosslinked copolymer, wherein at least benzoyl peroxide and t-butyl peroxybenzoate are used as the radical polymerization initiator; and (b) a step of sulfonating the crosslinked copolymer.

(c) a step of copolymerizing a monovinyl aromatic monomer with a crosslinkable aromatic monomer to obtain a crosslinked copolymer;

(d) a step of adjusting the polymerization temperature in the step (c) to 18° C. or more and 250° C. or less and setting a crosslinkable aromatic monomer content (purity) in the crosslinkable aromatic monomer at 57% by weight or more so that the content of an eluting compound represented by the chemical formula (I):

wherein Z represents a hydrogen atom or an alkyl group; and l represents a natural number;
is 400 µg or less relative to 1 g of the crosslinked copolymer of the monovinyl aromatic monomer and the crosslinkable aromatic monomer;

(e) a step of haloalkylating the crosslinked copolymer having the content of the eluting compound of 400 µg or less relative to 1 g of the crosslinked copolymer using a catalyst for Friedel-Crafts reaction in an amount of 0.001 to 0.7 parts by weight relative to 1 part by weight of the crosslinked copolymer;

(f) a step of washing the haloalkylated crosslinked copolymer with at least one solvent selected from the group consisting of benzene, toluene, xylene, acetone, diethyl ether, methylal, dichloromethane, chloroform, dichloroethane and trichloroethane to remove an eluting compound represented by the chemical formula (II):

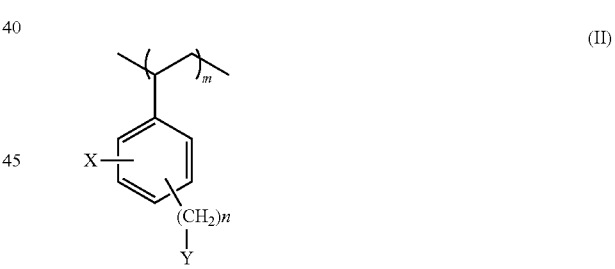

wherein X represents a hydrogen atom, a halogen atom or an alkyl group which may be substituted with a halogen atom; Y represents a halogen atom; and m and n each independently represent a natural number; from the haloalkylated crosslinked polymer; and (g) a step of reacting an amine compound with the haloalkylated crosslinked polymer from which the eluting compound has been removed.

The first H-form strong cation exchange resin, the salt-form strong anion exchange resin and the second H-form strong cation exchange resin used in the present invention are preferably gel-type resins.

The ion exchange resins include gel-type ion exchange resins and porous-type ion exchange resin. The gel-type ion exchange resins are preferred because they are smaller in the surface area and more oxidation-resistant to hydrogen peroxide in the purification of an aqueous hydrogen peroxide solution and they can therefore have more increased purification purity and purification stability, as compared with the porous-type ion exchange resins.

The "degree of crosslinking" means the weight ratio of the weight of a crosslinkable aromatic monomer as a crosslinking agent to the total of the weight of a monovinyl aromatic monomer and the crosslinkable aromatic monomer used for manufacturing an ion exchange resin. This is similar to the definition as used in the art.

A greater amount of the crosslinkable aromatic monomer used provides a denser resin having more network structure as a result of its chain structure more crosslinked, whereas a less amount of the crosslinkable aromatic monomer used provides a resin having a coarser network structure.

The commercially available ion exchange resins have a degree of crosslinking of about 4 to 20%. The resins having a degree of crosslinking of about 8% which is a region of easily removing ions are use as standard crosslinking resins in the usual water treatment. For this reason, the ion exchange resin used in Patent Literature 2 has the degree of crosslinking of 6 to 10 and preferably 7 to 9.

In the purification treatment according to the present invention, cationic metal ion impurities in an aqueous hydrogen peroxide solution can be removed by treatment with the first H-form strong cation exchange resin; anionic metallic impurities, a chloride ion and a sulfate ion can then be removed by treatment with the salt-form strong anion exchange resin; and trace amounts of metal ion impurities such as Na$^+$, K$^+$ or Al$^{3+}$ contained as impurities in the upstream salt-form strong anion exchange resin can further highly removed by treatment with the second H-form strong cation exchange resin.

<Highly Crosslinked Resin>

The highly crosslinked resin used as the first H-form strong cation exchange resin in the first H column 1 and/or the second H-form strong cation exchange resin in the second H column 3 is an H-form strong cation exchange resin having a degree of crosslinking of 9% or more and preferably a gel-type H-form strong cation exchange resin having a degree of crosslinking of 9% or more.

The highly crosslinked resin having a degree of crosslinking of 9% or more is a resin having an excellent oxidation resistance to hydrogen peroxide and a low elution property, and its use in, for example, the first H column 1 can thereby reduce the load from eluted materials therefrom to the downstream OH column 2 (the first OH column 2A and/or the second OH column 2B) and to stabilize the purification treatment.

Therefore, the first H column 1 is preferably packed with the highly crosslinked resin. When using the highly crosslinked resin in the second H column 3, a high oxidation resistance can also be obtained in the second H column 3.

The degree of crosslinking of the highly crosslinked resin is 9% or more and preferably more than 9%, and from the viewpoint of the balance between oxidation resistance and treatment efficiency, more preferably 10 to 20% and particularly preferably 11 to 16%. The resin having a degree of crosslinking of 12% or more is particularly excellent in oxidation resistance and elution resistance.

<Low Crosslinked Resin>

The low crosslinked resin used in the second H column 3 is an H-form strong cation exchange resin having a degree of crosslinking of 6% or less and preferably a gel-type H-form strong cation exchange resin having a degree of crosslinking of 6% or less.

The low crosslinked resin having a degree of crosslink of 6% or less is higher in removal efficiency and washing efficiency than standard crosslinked resins and can efficiently remove TOC (such as amines) eluted from the upstream OH column 2 (the first OH column 2A and/or the second OH column 2B), and is therefore suitable as an H-form strong cation exchange resin packed in the second H column 3.

The degree of crosslinking of the low crosslinked resin is 6% or less and preferably less than 6% such as 5% or less. The lower limit of the degree of crosslinking is usually about 4% since the lower limit of the degree of crosslinking of commercially available ion exchange resins is about 4%.

The low crosslinked resin preferably has ΔTOC of 20 μg/L or less as measured according to the ultrapure water passing test of (i) below.

(i) Ultrapure water passing test

1) Ultrapure water is passed through an empty measurement column alone at a space velocity (SV) of 50 hr$^{-1}$ with respect to the amount of a low crosslinked resin to be measured. After passing ultrapure water for 1 hour, the TOC concentration (TOC$_0$) in the outlet water of the measurement column alone is analyzed.

2) The low crosslinked resin to be measured is packed in the measurement column in the above 1), and then ultrapure water is passed through the measurement column packed with the low crosslinked resin at an SV of 50 hr$^{-1}$ with respect to the amount of the low crosslinked resin. After passing ultrapure water for 1 hour, the TOC concentration (TOC$_1$) in the outlet water of the measurement column is analyzed.

3) From the analysis results of 1) and 2) above, ΔTOC is calculated by the following equation:

$$\Delta TOC = TOC_1 - TOC_0$$

The water quality of the ultrapure water used in (i) ultrapure water passing test described above is as follows: resistivity: 18.0 MΩ·cm or more; TOC: 2 μg/L or less; silica: 0.1 μg/L or less; fine particles of φ50 nm or more; 5 particles/mL or less; metals: 1 ng/L or less; and anions: 1 ng/L or less.

If the low crosslinked resin has ΔTOC of 20 μg/L or less as measured according to the ultrapure water passing test of (i) described above, the elution amount of TOC from the resin is small. Use of the downstream second H column 3 packed with such a low crosslinked resin can stably provide a high-purity aqueous hydrogen peroxide solution.

<(a)-(b) Resin>

(a)-(b) resin is produced by the above steps (a) and (b), and the elution amount of TOC from the resin is small. Use of the first H column 1 and/or the second H column 2 packed with the (a)-(b) resin can stably provide a high-purity aqueous hydrogen peroxide solution.

Examples of the monovinyl aromatic monomer used in the step (a) include one or two or more of styrene, an alkyl-substituted styrene such as methylstyrene or ethylstyrene and a halogen-substituted styrene such as bromostyrene. It is preferably styrene or a monomer mainly composed of styrene.

Examples of the crosslinkable aromatic monomer include one or two or more of divinylbenzene, trivinylbenzene, and divinyltoluene. It is preferably divinylbenzene.

The amount of the crosslinkable aromatic monomer to be used varies depending on whether the (a)-(b) resin is used for the first H column 1 or the second H column 3. When using it in the first H column 1, the amount of the crosslinkable aromatic monomer to be used is preferably 9% by weight or more, particularly 10 to 20% by weight and especially 11 to 16% by weight relative to the total weight of the monomers so as to obtain a highly crosslinked resin. When using it in the second H column 3, the amount of the crosslinkable aromatic monomer to be used is preferably 6% by weight or less and particularly 4 to 6% by weight relative to the total weight of the monomers so as to obtain the above-described highly crosslinked resin or a low crosslinked resin.

The degree of crosslinking of the (a)-(b) resin is not limited to 9% or more or 6% or less and can be broadly set in the range of 4 to 20%.

Examples of the radical polymerization initiator to be used include dibenzoyl peroxide, lauroyl peroxide, t-butyl hydroperoxide and azobisisobutyronitrile, but benzoyl peroxide and t-butyl peroxybenzoate are at least used.

The mode of polymerization is not particularly limited, and polymerization may be carried out in various modes such as solution polymerization, emulsion polymerization or suspension polymerization. The suspension polymerization process capable of producing a homogeneous bead-like copolymer is preferably adopted. The suspension polymerization process can be carrying by using such a solvent and a dispersion stabilizer as generally used in the production of this type of copolymer and selecting known reaction conditions.

The polymerization temperature in the copolymerization reaction is 70° C. or more and 250° C. or less, preferably 150° C. or less, and more preferably 140° C. or less. Too high a polymerization temperature causes depolymerization concurrently and rather reduces the degree of polymerization completion. Too low a polymerization temperature leads to an insufficient degree of polymerization completion.

The polymerization can be carried out under an atmosphere of air or an inert gas. Examples of the inert gas to be used include nitrogen, carbon dioxide and argon.

The sulfonation in the step (b) can be carried out according to any conventional method.

The thus obtained (a)-(b) resin usually has a low elution property with ΔTOC of 5 µg/L or less as measured according to the ultrapure water passing test of (i) described above.

<Salt-Form Strong Anion Exchange Resin>

There is no particular limitation to the type of salt form of the salt-form strong anion exchange resin to be packed in the OH column 2 (the first OH column 2A and/or the second OH column 2B) and the method for producing it in the salt form. Examples of the salt form include a carbonate salt form, a bicarbonate salt form, a halogenide (F, Cl or Br) form and a sulfate form. It is preferably a carbonate salt form or bicarbonate salt form. The salt-form strong anion exchange resin is preferably a gel-type salt-form strong anion exchange resin.

The salt-form strong anion exchange is preferably an (c)-(g) resin described above, since the latter is small in the elution amount from the resin and can stably provide a high-purity aqueous hydrogen peroxide solution.

Examples of the monovinyl aromatic monomer used in the step (c) include one or two or more of styrene, an alkyl-substituted styrene such as methylstyrene or ethylstyrene and a halogen-substituted styrene such as bromostyrene. It is preferably styrene or a monomer mainly composed of styrene.

Examples of the crosslinkable aromatic monomer include one or two or more of divinylbenzene, trivinylbenzene and divinyltoluene. It is preferably divinylbenzene.

The amount of the crosslinkable aromatic monomer to be used may be in any ratio capable of providing the (c)-(g) resin having a suitable degree of crossing.

The copolymerization reaction of the monovinyl aromatic monomer with the crosslinkable aromatic monomer can be carried out with a radical polymerization initiator, based on any known technique.

Examples of the radical polymerization initiator to be used include one or two or more dibenzoyl peroxide, lauroyl peroxide, t-butyl hydroperoxide and azobisisobutyronitrile. The radical polymerization initiator is usually used in an amount of 0.05% by weight or more and 5% by weight or less relative to the total weight of the monomers.

The mode of polymerization is not particularly limited, and polymerization may be carried out in various modes such as solution polymerization, emulsion polymerization or suspension polymerization. Among them, the suspension polymerization process capable of producing a homogeneous bead-like copolymer is preferably adopted. The suspension polymerization process can be carrying by using such a solvent and a dispersion stabilizer as generally used in the production of this type of copolymer and selecting known reaction conditions.

The polymerization temperature in the copolymerization reaction is usually room temperature (about 18° C. to 25° C.) or more, preferably 40° C. or more, more preferably 70° C. or more, and usually 250° C. or less, preferably 150° C. or less and more preferably 140° C. or less. Too high a polymerization temperature causes depolymerization concurrently and rather reduces the degree of polymerization completion. Too low a polymerization temperature leads to an insufficient degree of polymerization completion.

The polymerization can be carried out under an atmosphere of air or an inert gas. Examples of the inert gas to be used include nitrogen, carbon dioxide and argon.

The alkyl group represented by Z in the eluting compound represented by the above formula (I) in the step (d) (hereinafter sometimes referred to as "eluting compound (I)") is an alkyl group having 1 to 8 carbon atoms, preferably a methyl group, an ethyl group, a propyl group or a butyl group and more preferably a methyl group or an ethyl group.

The content of the eluting compound (I) in the crosslinked copolymer to be subjected to haloalkylation in the step (e), which is more than 400 µg relative to 1 g of the aqueous hydrogen peroxide solution, cannot provide an anion exchange resin reduced in an amounts of eluted materials and having residual impurities and generation of decomposition products inhibited therein. The content of the eluting compound (I) is preferably as low as possible, preferably 30 µg or less and more preferably 200 µg or less relative to 1 g of the aqueous hydrogen peroxide solution, and the lower limit thereof is usually about 50 µg.

The step (d) is carried out particularly simultaneously with the step (c) by adjusting the polymerization conditions in the step (c). For example, the polymerization temperature in the step (c) can be adjusted to 18° C. or more and 250° C. or less to increase the degree of polymerization completion, providing a crosslinked copolymer reduced in the eluting compound (I). The crosslinkable aromatic monomer such as divinylbenzene contains non-polymerizable impurities such as diethylbenzene, which cause the generation of the eluting compound (I). Therefore, selection and use of a crosslinkable aromatic monomer to be used for polymerization of a specific grade having a crosslinkable aromatic monomer content (purity) of 57% by weight or more can provide a crosslinked copolymer low in the content of the eluting compound (I).

The crosslinkable aromatic monomer content (purity) of the crosslinkable aromatic monomer is particularly preferably 60% by weight or more, and further preferably 80% by weight or more. The content of the non-polymerizable impurities in the crosslinkable aromatic monomer is usually 5% by weight or less per monomer weight, preferably 3% by weight or less per monomer weight, and more preferably 1% by weight or less per monomer weight. The crosslinkable aromatic monomer having too high impurity content is likely to cause chain transfer reaction with the impurities during polymerization, which may lead to an increase in the amount of the eluting oligomer (polystyrene) remaining in the polymer after completion of polymerization, and cannot thus provide any crosslinked copolymer low in the content of the eluting compound (I).

The eluting compound (I) can be also removed after polymerization by washing the resulting crosslinked copolymer, to obtain a crosslinked copolymer reduced in the content of the eluting compound.

The step (e) of haloalkylating the crosslinked copolymer is a step of haloalkylating the crosslinked copolymer obtained in the step (d) by reacting it in a swollen state with a haloalkylating agent in the presence of a catalyst for Friedel-Crafts reaction.

A swelling solvent such as dichloroethane can be used to swell the crosslinked copolymer. The crosslinked copolymer is preferably swollen with only a haloalkylating agent in order to allow halomethylation to sufficiently proceed.

Examples of the catalyst for Friedel-Crafts reaction include Lewis acid catalysts such as zinc chloride, iron (III) chloride, tin (IV) chloride and aluminum chloride. These catalysts may be used alone or in combination of two or more.

It is preferable to use a haloalkylating agent having a high compatibility with the copolymer, in order to allow the haloalkylating agent to act not only as a reaction reagent but also as a swelling solvent for the copolymer. Examples of such a haloalkylating agent include a halogen compound such as chloromethyl methyl ether, methylene chloride, bis(chloromethyl)ether, polyvinyl chloride and bis(chloromethyl)benzene. These may be used alone or in combination of two or more. A more preferred haloalkylating agent is chloromethyl methyl ether. The haloalkylation in the present invention is preferably chloromethylation.

It is preferable that the introduction rate of the haloalkyl group in the step (e) is 80% or less, preferably 75% or less and more preferably 70% or less relative to the theoretical halogen content when 100 mol % of the monovinyl aromatic monomer is assumed to be haloalkylated. Increasing such an induction rate of the haloalkyl group (the percentage of the introduced halogen atom to the theoretical halogen content when 100 mol % of the monovinyl aromatic monomer is assumed to be haloalkylated) causes the main chain of the crosslinked copolymer to be cleaved at the time of introduction and cause the excessively introduced haloalkyl group to be released after introduction, resulting in impurities. Limitation of the introduction rate of the haloalkyl group makes it possible to inhibit production of impurities to provide an anion exchange resin reduced in the amounts of eluted materials.

Limitation of the introduction amount of the haloalkyl group also reduces the side reaction in the haloalkylation step and is thereby less likely to generate the eluting oligomer. The by-product generated which is difficult to be removed by washing at the later steps is also less than those of conventional formulations. As a result, it is possible to provide an anion exchange resin remarkably reduced in the amounts of eluted materials.

A specific method for introducing a haloalkyl group is as follows:

The amount of a haloalkylating agent to be used is selected from a wide range depending on the degree of crosslinking of a crosslinked copolymer and other conditions, but it is preferably at least enough an amount to swell the crosslinked copolymer, usually 1 part by weight or more, preferably 2 parts by weight or more and usually 50 parts by weight or less and preferably 20 parts by weight or less relative to 1 part by weight of the crosslinked copolymer.

The amount of the catalyst for the Friedel-Crafts reaction to be used is usually 0.001 to 7 parts by weight, preferably 0.1 to 0.7 parts by weight and more preferably 0.1 to 0.7 parts by weight relative to 1 part by weight of the crosslinked copolymer.

Examples of the means for adjusting the introduction rate of the haloalkyl group into the crosslinked copolymer to 80% or less include such a means as lowering the reaction temperature, using a low-activity catalyst or decreasing the amount of the catalyst to be added. Examples of the main factor affecting the reaction of the crosslinked copolymer with the haloalkylating agent include a reaction temperature, the activity (type) of catalyst for Friedel-Crafts reaction and the amount thereof added, the amount of the haloalkylating agent added, and the like. Therefore, adjustment of the conditions makes it possible to control the introduction rate of the haloalkylating agent.

The reaction temperature also varies depending on the type of catalyst for Friedel-Crafts reaction to be used, but it is usually 0 to 55° C. The preferred reaction temperature range varies depending on the haloalkylating agent to be used and the catalyst for Friedel-Crafts reaction to be used. For example, the preferred reaction temperature range is usually 30° C. or more, preferably 35° C. or more and usually 50° C. or less and preferably is 45° C. or less, when using chloromethyl methyl ether as a haloalkylating agent and zinc chloride as a catalyst for Friedel-Crafts reaction. At this time, excessive introduction of the haloalkyl group can be inhibited by appropriately selecting the reaction time and the like.

In the introduction reaction of the haloalkyl group, the post-crosslinking reaction also proceeds simultaneously. The introduction of the haloalkyl group means also ensuring the strength of the final product by the post-crosslinking reaction, and it is therefore better to secure some time for the haloalkyl group introduction reaction. The reaction time of haloalkylation is preferably 30 minutes or more, more preferably 3 hours or more and further preferably 5 hours or more. The reaction time of haloalkylation is preferably 24 hours or less, more preferably 12 hours or less and further preferably 9 hours or less.

The step (0 is a step of purifying the haloalkylated crosslinked copolymer by washing it with the particular solvent described above to remove the eluting compound represented by the above formula (II) (hereinafter sometimes referred to as "eluting compound (II)") so that the content of the eluting compound (II) is preferably 400 μg or less, more preferably 100 μg or less, particularly preferably 50 μg or less and especially preferably 30 μg or less relative to 1 g of the haloalkylated crosslinked copolymer. The high content of the eluting compound (II) cannot provide an anion exchange resin reduced in the amounts of the eluted materials and having residual impurities and generation of decomposition products inhibited therein. The content of eluting compound (II) is preferably as low as possible, but the lower limit thereof is usually about 30 μg.

In the formula (II), the alkyl group which may be substituted with a halogen atom represented by X is usually an alkyl group or a haloalkyl group having 1 to 10 carbon atoms, preferably a methyl group, an ethyl group, a propyl group, a butyl group, a halomethyl group, a haloethyl group, a halopropyl group or a halobutyl group, and more preferably a methyl group, an ethyl group, a halomethyl group or a haloethyl group.

n is usually 1 or more and usually 8 or less, preferably 4 or less and more preferably 2 or less.

The washing process with the above-described solvent can be carried out by a column process in which the solvent is passed through a column packed with a haloalkylated crosslinked copolymer, or by a batch washing process.

The washing temperature is usually room temperature (20° C.) or more, preferably 30° C. or more, more preferably 50° C. or more and particularly preferably 90° C. or more, and usually 150° C. or less, preferably 130° C. or less and more preferably 120° C. or less. Too high a washing temperature causes decomposition of the polymer and elimination of the haloalkyl group concurrently. Too low a washing temperature reduces the washing efficiency.

The length of contact time with the solvent is usually 5 minutes or longer, preferably not shorter than a length of time it takes to swell 80% or more of the crosslinked copolymer, and usually 4 hours or shorter. Too short a length of contact time reduces the washing efficiency, whereas too long a length of contact time reduces the productivity.

The step (g) is a step of reacting an amine compound with the haloalkylated crosslinked copolymer from which the eluting compound (II) has been removed to introduce an amino group thereinto so as to produce an anion exchange resin. Introduction of the amino group can be easily carried out by any known technique.

Examples of the introduction technique include a process in which a haloalkylated crosslinked copolymer is suspended in a solvent and allowed to react with trimethylamine or dimethylethanolamine.

Examples of the solvent to be used for the introduction reaction include water, toluene, dioxane, dimethylformamide and dichloroethane, which are used alone or in combination.

Subsequently, the salt form is converted into the each desired form by any known process to obtain a salt-form strong anion exchange resin to be packed in the OH column 2 (the first OH column 2A and/or the second OH column 2B).

The salt-form strong anion exchange resin obtained by thus converting the (c)-(g) resin into its salt form is usually a resin having a low elution property with ΔTOC of 20 μg/L or less as measured according to the ultrapure water passing test of (i) described above.

Configuration Example of Resin Column

Specific examples of the purification treatment for an aqueous hydrogen peroxide solution according to the present invention include following configuration examples of resin columns:

Configuration example 1: a process in which a purification treatment is sequentially carried out with: a highly crosslinked resin column→a salt-form strong anion exchange resin column→a low crosslinked resin column.

Configuration example 2: a process in which a purification treatment is sequentially carried out with: a highly crosslinked resin column→a salt-form strong anion exchange resin column→a highly crosslinked resin column.

As described above, the upstream first 1H column 1 packed with the highly crosslinked resin excellent in oxidation resistance reduces the elution amount from the first H column 1 whereby reducing the load to the downstream OH column 2 (the first OH column 2A and/or the second OH column 2B).

In the configuration example 1 using the low crosslinked resin used in the downstream second H column 3, TOC (such as amines) eluted from the gel-type salt-form strong anion exchange resin in the upstream OH column 2 (the first OH column 2A and/or the second OH column 2B) can be removed and further efficiently washed and regenerate in the downstream second H column 3.

In the configuration example 2 using the highly crosslinked resin used in the downstream second H column 3, the elution amount can be reduced with sufficiently high oxidation resistance also in the second H column 3.

In both of the configuration examples 1 and 2, impurities such as metal ions in an aqueous hydrogen peroxide solution can be highly removed by ion exchange with the salt-form strong anion exchange resin and H-form strong cation exchange resins to inhibit TOC from eluting from the resins and to thereby stably obtain a high-purity aqueous hydrogen peroxide solution.

The amount of the resins packed in resin columns and water passing conditions are not particularly limited. The packing amounts of salt-form strong anion exchange resin(s) and H-form strong cation exchange resin(s) (ratio by volume) and the space velocity (SV) are designed in a balanced manner depending on the impurity concentration in the aqueous hydrogen peroxide solution before purification.

<Aqueous Hydrogen Peroxide Solution>

Examples of the aqueous hydrogen peroxide solution to be purified include an industrial aqueous hydrogen peroxide solution produced by a known production method such as the anthraquinone autoxidation method described above and a direct synthesis method by directly reacting hydrogen with oxygen. The hydrogen peroxide concentration in the aqueous hydrogen peroxide solution is not particularly limited and is any concentration of 70% by weight or less. In Japan, an industrial aqueous hydrogen peroxide solution is specified as having a hydrogen peroxide concentration of 35% by weight, 45% by weight or 60% by weight according to Japanese Industrial Standards.

An industrial aqueous hydrogen peroxide solution is preferably treated with an RD membrane and then according to the present invention, treated sequentially with the first H column 1, the OH column 2 (the first OH column 2A and/or the second OH column 2B) and the second H column 3.

EXAMPLES

The present invention will be more specifically described below with reference to Example and Comparative Example.

In the following Examples and Comparative Examples, a 35% by weight industrial aqueous hydrogen peroxide solution, which had been treated with an RD membrane, was purified using the purification system for an aqueous hydrogen peroxide solution comprising the first H column 1, the OH column 2 and the second H column 3 shown in FIG. 1, each being made of PTFE (polytetrafluoroethylene) in a clean room of Class 1000 (according to American Federal Standard Fed. Std. 209 D; this is equivalent to Class 6 according to JIS Standard JIS B 9920 and ISO Standard ISO 14644-1).

The cation exchange resin and the anion exchange resin used were those shown in the following Tables 1A and 1B.

ΔTOC of each cation exchange resin shown in Table 1A is a value of ΔTOC determined from the TOC concentration obtained by subjecting the cation exchange resin to the ultrapure water passing test of (i) described above before packing it in a resin column and measuring the TOC concentration with an on-line TOC meter (Anatel A 1000, manufactured by Hach Ultra Analytics Japan Inc.).

Each anion exchange resin used was a salt-form or bicarbonate-form anion exchange resin.

TABLE 1A

<Cation exchange resins>

| Product name | Type of resin | Degree of Crosslinking (%) | ΔTOC (µg/L) |
|---|---|---|---|
| "KR-UC1" manufactured by Kurita Water Industries Ltd. | gel-type H-form strong cation exchange resin | 10 | — |
| "SK104" manufactured by Mitsubishi Chemical Corporation | gel-type H-form strong cation exchange resin | 4 | 20 |
| "KR-FC" manufactured by Kurita Water Industries Ltd. | gel-type H-form strong cation exchange resin ((a) - (b) resin) | 11 | — |
| "SK1B" manufactured by Mitsubishi Chemical Corporation | gel-type H-form strong cation exchange resin | 8 | — |

TABLE 1B

<Anion exchange resins>

| Product name | Type of resin | Form of salt |
|---|---|---|
| "KR-UA1" manufactured by Kurita Water Industries Ltd. | Gel-type salt-form strong anion exchange resin | Bicarbonate-form |
| "KR-FA" manufactured by Kurita Water Industries Ltd. | Gel-type salt-form strong anion exchange resin ((c) - (g) resin) | Bicarbonate-form |

Examples 1 to 8 and Comparative Examples 1 to 4

The ion exchange resins packed in the first H column 1, the OH column 2 and the second H column 3 were those shown in Table 2, respectively. The packing was conducted so that the amounts of the ion exchange resins packed in the first H column 1, the OH column 2 and the second H column 3 were in a ratio of 2:1:4 by volume. The aqueous hydrogen peroxide solution treated with the RO membrane described above was passed through the columns so that the space velocity (SV) was 5 $hr^{-1}$ for the amount of the gel-type H-form strong cation exchange resin packed with the second H column 3, and a purified aqueous hydrogen peroxide solution was sampled.

The TOC (total organic carbon) concentration in the purified aqueous hydrogen peroxide solution was measured with an off-line TOC meter ("TOC-VCPH" manufactured by Shimadzu Corporation). The metal concentration in the purified aqueous hydrogen peroxide solution was measured with an inductively coupled plasma-mass spectrometer (ICP-MS) (Agilent 7500 cs, manufactured by Agilent Technologies Japan, Ltd.).

The comparison of the TOC concentration and the metal concentration in the purified aqueous hydrogen peroxide solution in each of Examples 1 to 4 with those in each of Comparative Examples 1 and 2 is shown in Table 3A and Table 3B. Table 3A shows the comparison of the TOC concentration and the metal concentration in the purified aqueous hydrogen peroxide solution after passing the aqueous hydrogen peroxide solution for 2 hours. Table 3B shows the comparison of the TOC concentration and the metal concentration in the purified aqueous hydrogen peroxide solution after passing the aqueous hydrogen peroxide solution for 4 hours.

The comparison of the TOC concentration and the metal concentration in each of Examples 5 to 8 with those in each of Comparative Examples 3 and 4 is shown in Table 4A and Table 4B. Table 4A shows the comparison of the TOC concentration and the metal concentration in the purified aqueous hydrogen peroxide solution after passing the aqueous hydrogen peroxide solution for 2 hours. Table 4A shows the comparison of the TOC concentration and the metal concentration in the purified aqueous hydrogen peroxide solution after passing the aqueous hydrogen peroxide solution for 4 hours.

TABLE 2

| | First H column | OH column | Second H column | Remarks * |
|---|---|---|---|---|
| Example 1 | KR-UC1 (degree of crosslinking: 10%) | KR-UA1 | SK104 (degree of crosslinking: 4%) | Highly-crosslinked resin → low-crosslinked resin |
| Example 2 | KR-UC1 (degree of crosslinking: 10%) | KR-UA1 | KR-FC (degree of crosslinking: 11%; (a) - (b) resin) | Highly-crosslinked resin → highly-crosslinked resin |
| Example 3 | KR-FC (degree of crosslinking: 11%; (a) - (b) resin) | KR-UA1 | SK104 (degree of crosslinking: 4%) | Highly-crosslinked resin → low-crosslinked resin |
| Example 4 | KR-FC (degree of crosslinking: 11%; (a) - (b) resin) | KR-UA1 | KR-FC (degree of crosslinking: 11%; (a) - (b) resin) | Highly-crosslinked resin → highly-crosslinked resin |
| Example 5 | KR-UC1 (degree of crosslinking: 10%) | KR-FA ((c) - (g) resin) | SK104 (degree of crosslinking: 4%) | Highly-crosslinked resin → low-crosslinked resin |
| Example 6 | KR-UC1 (degree of crosslinking: 10%) | KR-FA ((c) - (g) resin) | KR-FC (degree of crosslinking: 11%; (a) - (b) resin) | Highly-crosslinked resin → highly-crosslinked resin |
| Example 7 | KR-FC (degree of crosslinking: 11%; (a) - (b) resin) | KR-FA ((c) - (g) resin) | SK104 (degree of crosslinking: 4%) | Highly-crosslinked resin → low-crosslinked resin |
| Example 8 | KR-FC (degree of crosslinking: 11%; (a) - (b) resin) | KR-FA ((c) - (g) resin) | KR-FC (degree of crosslinking: 11%; (a) - (b) resin) | Highly-crosslinked resin → highly-crosslinked resin |

TABLE 2-continued

| | First H column | OH column | Second H column | Remarks * |
|---|---|---|---|---|
| Comparative Example 1 | KR-UC1 (degree of crosslinking: 10%) | KR-UA1 | SK1B (degree of crosslinking: 8%) | Highly-crosslinked resin → standard crosslinked resin |
| Comparative Example 2 | KR-FC (degree of crosslinking: 11%; (a) - (b) resin) | KR-UA1 | SK1B (degree of crosslinking: 8%) | Highly-crosslinked resin → standard crosslinked resin |
| Comparative Example 3 | KR-UC1 (degree of crosslinking: 10%) | KR-FA ((c) - (g) resin) | SK1B (degree of crosslinking: 8%) | Highly-crosslinked resin → standard crosslinked resin |
| Comparative Example 4 | KR-FC (degree of crosslinking: 11%; (a) - (b) resin) | KR-FA ((c) - (g) resin) | SK1B (degree of crosslinking: 8%) | Highly-crosslinked resin → standard crosslinked resin |

* Combination of degrees of crosslinking of the H-form strong cation exchange resins used in the first H column and the second H column

TABLE 3A

<After passing aqueous hydrogen peroxide solution for 2 hours>

| | | Example | | | | Comparative Example | |
|---|---|---|---|---|---|---|---|
| | | 1 | 2 | 3 | 4 | 1 | 2 |
| TOC concentration | mg/L | 6 | 5 | 6 | 5 | 9 | 9 |
| Metal concentration | Al ng/L | 2 | 1 | 2 | 1 | 15 | 15 |
| | Ca ng/L | 1 | 1 | 2 | 1 | 39 | 34 |
| | Fe ng/L | 2 | 2 | 2 | 1 | 14 | 15 |
| | Mg ng/L | 2 | 1 | 2 | 1 | 24 | 21 |
| | Na ng/L | 1 | 1 | 1 | 1 | 18 | 18 |
| | Ni ng/L | 1 | 1 | 1 | 1 | 15 | 15 |
| | Zn ng/L | 2 | 2 | 2 | 1 | 10 | 11 |

TABLE 3B

<After passing aqueous hydrogen peroxide solution for 4 hours>

| | | Example | | | | Comparative Example | |
|---|---|---|---|---|---|---|---|
| | | 1 | 2 | 3 | 4 | 1 | 2 |
| TOC concentration | mg/L | 6 | 5 | 6 | 5 | 8 | 8 |
| Metal concentration | Al ng/L | 2 | 1 | 2 | 1 | 7 | 7 |
| | Ca ng/L | 1 | 1 | 2 | 1 | 15 | 15 |
| | Fe ng/L | 2 | 2 | 2 | 1 | 12 | 10 |
| | Mg ng/L | 2 | 1 | 2 | 1 | 8 | 8 |
| | Na ng/L | 1 | 1 | 1 | 1 | 11 | 10 |
| | Ni ng/L | 1 | 1 | 1 | 1 | 8 | 8 |
| | Zn ng/L | 2 | 2 | 2 | 1 | 5 | 5 |

TABLE 4A

<After passing aqueous hydrogen peroxide solution for 2 hours>

| | | Example | | | | Comparative Example | |
|---|---|---|---|---|---|---|---|
| | | 5 | 6 | 7 | 8 | 7 | 8 |
| TOC concentration | mg/L | 6 | 5 | 5 | 4 | 9 | 9 |
| Metal concentration | Al ng/L | 2 | 1 | 2 | 1 | 13 | 15 |
| | Ca ng/L | 1 | 1 | 2 | 1 | 33 | 34 |
| | Fe ng/L | 2 | 1 | 2 | 1 | 14 | 13 |
| | Mg ng/L | 2 | 1 | 2 | 1 | 21 | 20 |
| | Na ng/L | 1 | 1 | 1 | 1 | 17 | 15 |
| | Ni ng/L | 1 | 1 | 1 | 1 | 15 | 15 |
| | Zn ng/L | 2 | 1 | 2 | 1 | 10 | 10 |

TABLE 4B

<After passing aqueous hydrogen peroxide solution for 4 hours>

| | | Example | | | | Comparative Example | |
|---|---|---|---|---|---|---|---|
| | | 5 | 6 | 7 | 8 | 7 | 8 |
| TOC concentration | mg/L | 6 | 5 | 5 | 4 | 8 | 8 |
| Metal concentration | Al ng/L | 2 | 1 | 2 | 1 | 7 | 7 |
| | Ca ng/L | 1 | 1 | 2 | 1 | 15 | 15 |
| | Fe ng/L | 2 | 1 | 2 | 1 | 9 | 10 |
| | Mg ng/L | 2 | 1 | 2 | 1 | 8 | 8 |
| | Na ng/L | 1 | 1 | 1 | 1 | 10 | 10 |
| | Ni ng/L | 1 | 1 | 1 | 1 | 8 | 8 |
| | Zn ng/L | 2 | 1 | 2 | 1 | 3 | 3 |

Table 3A and Table 3B show that purification of an aqueous hydrogen peroxide solution with the second H column packed with a gel-type H-form strong cation exchange resin having a degree of crosslinking of 6% or less, or a (a)-(b) resin which is a gel-type H-form strong cation exchange resin, or a gel-type salt-form strong anion exchange resin having a degree of crosslinking of 9% or more can stably inhibit the impurity concentration in the purified aqueous hydrogen peroxide solution to a low level starting from the initial stage of purification.

Table 4A and Table 4B show that treatment of the aqueous hydrogen peroxide solution with the OH column packed with a (c)-(g) resin which is a gel-type salt-form strong anion exchange resin can further stabilize the impurity concentration.

According to the present invention, use of specified ion exchange resins in purification of an aqueous hydrogen peroxide solution can thus stabilize the quality of the resulting purified aqueous hydrogen peroxide solution and achieve improvement in the productivity thereof.

The present invention has been described in detail with reference to specific embodiments, but it will be apparent to those skilled in the art that various modifications are possible without departing from the spirit and scope of the present invention.

The present application is based on Japanese Patent Application No. 2016-206084 filed on Oct. 20, 2016, the entirety of which is incorporated herein by reference.

REFERENCE SIGNS LIST

1 first H-form strong cation exchange resin column (first H column)
2 salt-form strong anion exchange resin column (OH column)

2A first salt-form strong anion exchange resin column (first OH column)
2B second salt-form strong anion exchange resin column (second OH column)
3 second H-form strong cation exchange resin column (second H column)

The invention claimed is:

1. A purification method for an aqueous hydrogen peroxide solution, comprising sequentially contacting the aqueous hydrogen peroxide solution with:
   a first H-form strong cation exchange resin, which is an H-form strong cation exchange resin having a degree of crosslinking of 9% or more, to remove cationic metal ion impurities in the aqueous hydrogen peroxide solution and to reduce an elution amount,
   a salt-form strong anion exchange resin to remove anionic metallic impurities, a chloride ion and a sulfate ion, and
   a second H-form low cation exchange resin, which is an H-form strong cation exchange resin having a degree of crosslinking of 6% or less, to remove TOC eluted from the salt-form strong anion exchange resin.

2. The purification method for an aqueous hydrogen peroxide solution according to claim 1,
   wherein the second H-form strong cation exchange resin is an H-form strong cation exchange resin produced by the following steps (a) and (b):
   (a) a step of copolymerizing a monovinyl aromatic monomer with a crosslinkable aromatic monomer having a non-polymerizable impurity content of 3% by weight or less therein using a radical polymerization initiator at a concentration of 0.05% by weight or more and 5% by weight or less relative to the total weight of the monomers at a polymerization temperature of 70° C. or more and 250° C. or less to obtain a crosslinked copolymer, wherein at least benzoyl peroxide and t-butyl peroxybenzoate are used as the radical polymerization initiator; and
   (b) a step of sulfonating the crosslinked copolymer.

3. The purification method for an aqueous hydrogen peroxide solution according to claim 2,
   wherein the first H-form strong cation exchange resin is an H-form strong cation exchange resin produced by the following steps (a) and (b):
   (a) a step of copolymerizing a monovinyl aromatic monomer with a crosslinkable aromatic monomer having a non-polymerizable impurity content of 3% by weight or less therein using a radical polymerization initiator at a concentration of 0.05% by weight or more and 5% by weight or less relative to the total weight of the monomers at a polymerization temperature of 70° C. or more and 250° C. or less to obtain a crosslinked copolymer, wherein at least benzoyl peroxide and t-butyl peroxybenzoate are used as the radical polymerization initiator; and
   (b) a step of sulfonating the crosslinked copolymer.

4. The purification method for an aqueous hydrogen peroxide solution according to claim 2, wherein the salt-form strong anion exchange resin is produced by the following steps (c), (d), (e), (f) and (g):
   (c) a step of copolymerizing a monovinyl aromatic monomer with a crosslinkable aromatic monomer to obtain a crosslinked copolymer;
   (d) a step of adjusting the polymerization temperature in the step (c) to 18° C. or more and 250° C. or less and setting a crosslinkable aromatic monomer content (purity) in the crosslinkable aromatic monomer at 57% by weight or more so that the content of an eluting compound represented by the chemical formula (I):

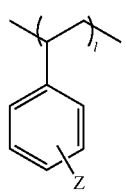

wherein Z represents a hydrogen atom or an alkyl group; and l represents a natural number;
is 400 μg or less relative to 1 g of the crosslinked copolymer of the monovinyl aromatic monomer and the crosslinkable aromatic monomer;
   (e) a step of haloalkylating the crosslinked copolymer having the content of the eluting compound of 400 μg or less relative to 1 g of the crosslinked copolymer using a catalyst for Friedel-Crafts reaction in an amount of 0.001 to 0.7 parts by weight relative to 1 part by weight of the crosslinked copolymer;
   (f) a step of washing the haloalkylated crosslinked copolymer with at least one solvent selected from the group consisting of benzene, toluene, xylene, acetone, diethyl ether, methylal, dichloromethane, chloroform, dichloroethane and trichloroethane to remove an eluting compound represented by the chemical formula (II):

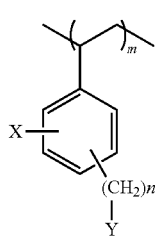

wherein X represents a hydrogen atom, a halogen atom or an alkyl group which may be substituted with a halogen atom; Y represents a halogen atom; and m and n each independently represent a natural number;
from the haloalkylated crosslinked polymer; and
   (g) a step of reacting an amine compound with the haloalkylated crosslinked polymer from which the eluting compound has been removed.

5. The purification method for an aqueous hydrogen peroxide solution according to claim 1, wherein at least one of the first H-form strong cation exchange resin, the salt-form strong anion exchange resin and the second H-form strong cation exchange resin is a gel-type resin.

6. The purification method for an aqueous hydrogen peroxide solution according to claim 1, wherein after the aqueous hydrogen peroxide solution passes through the salt-form strong anion exchange resin, the aqueous hydrogen peroxide solution passes through another salt-form strong anion exchange resin.

7. A purification method for an aqueous hydrogen peroxide solution, comprising sequentially contacting the aqueous hydrogen peroxide solution with:

a first H-form strong cation exchange resin, which is an H-form strong cation exchange resin having a degree of crosslinking of 9% or more, to remove cationic metal ion impurities in the aqueous hydrogen peroxide solution, a salt-form strong anion exchange resin to remove anionic metallic impurities, a chloride ion and a sulfate ion, and a second H-form strong cation exchange resin, which is the H-form strong cation exchange resin having the degree of crosslinking of 9% or more, to remove trace amounts of metal ion impurities contained in the salt-form strong anion exchange resin with oxidation resistance.

8. The purification method for an aqueous hydrogen peroxide solution according to claim 7,
wherein the second H-form strong cation exchange resin is an H-form strong cation exchange resin produced by the following steps (a) and (b):
(a) a step of copolymerizing a monovinyl aromatic monomer with a crosslinkable aromatic monomer having a non-polymerizable impurity content of 3% by weight or less therein using a radical polymerization initiator at a concentration of 0.05% by weight or more and 5% by weight or less relative to the total weight of the monomers at a polymerization temperature of 70° C. or more and 250° C. or less to obtain a crosslinked copolymer, wherein at least benzoyl peroxide and t-butyl peroxybenzoate are used as the radical polymerization initiator; and
(b) a step of sulfonating the crosslinked copolymer.

9. The purification method for an aqueous hydrogen peroxide solution according to claim 8, wherein:
the first H-form strong cation exchange resin is an H-form strong cation exchange resin produced by the following steps (a) and (b):
(a) a step of copolymerizing a monovinyl aromatic monomer with a crosslinkable aromatic monomer having a non-polymerizable impurity content of 3% by weight or less therein using a radical polymerization initiator at a concentration of 0.05% or more and 5% by weight or less by weight relative to the total weight of the monomers at a polymerization temperature of 70° C. or more and 250° C. or less to obtain a crosslinked copolymer, wherein at least benzoyl peroxide and t-butyl peroxybenzoate are used as the radical polymerization initiator; and
(b) a step of sulfonating the crosslinked copolymer.

10. The purification method for an aqueous hydrogen peroxide solution according to claim 8, wherein the salt-form strong anion exchange resin is produced by the following steps (c), (d), (e), (f) and (g):
(c) a step of copolymerizing a monovinyl aromatic monomer with a crosslinkable aromatic monomer to obtain a crosslinked copolymer;
(d) a step of adjusting the polymerization temperature in the step (c) to 18° C. or more and 250° C. or less and setting a crosslinkable aromatic monomer content (purity) in the crosslinkable aromatic monomer at 57% by weight or more so that the content of an eluting compound represented by the chemical formula (I):

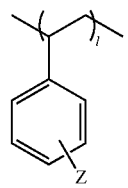

wherein Z represents a hydrogen atom or an alkyl group; and 1 represents a natural number;
is 400 μg or less relative to 1 g of the crosslinked copolymer of the monovinyl aromatic monomer and the crosslinkable aromatic monomer;
(e) a step of haloalkylating the crosslinked copolymer having the content of the eluting compound of 400 μg or less relative to 1 g of the crosslinked copolymer using a catalyst for Friedel-Crafts reaction in an amount of 0.001 to 0.7 parts by weight relative to 1 part by weight of the crosslinked copolymer;
(f) a step of washing the haloalkylated crosslinked copolymer with at least one solvent selected from the group consisting of benzene, toluene, xylene, acetone, diethyl ether, methylal, dichloromethane, chloroform, dichloroethane and trichloroethane to remove an eluting compound represented by the chemical formula (II):

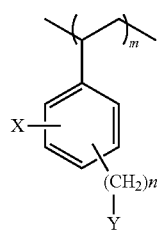

wherein X represents a hydrogen atom, a halogen atom or an alkyl group which may be substituted with a halogen atom; Y represents a halogen atom; and m and n each independently represent a natural number;
from the haloalkylated crosslinked polymer; and
(g) a step of reacting an amine compound with the haloalkylated crosslinked polymer from which the eluting compound has been removed.

11. The purification system for an aqueous hydrogen peroxide solution according to claim 7, wherein at least one of the first H-form strong cation exchange resin, the salt-form strong anion exchange resin and the H-form strong cation exchange resin is a gel-type resin.

12. The purification method for an aqueous hydrogen peroxide solution according to claim 7, wherein after the aqueous hydrogen peroxide solution passes through the salt-form strong anion exchange resin, the aqueous hydrogen peroxide solution passes through another salt-form strong anion exchange resin.

* * * * *